United States Patent [19]
Fischer

[11] 3,835,201
[45] Sept. 10, 1974

[54] THERMOPLASTIC BLEND OF COPOLYMER RUBBER AND POLYOLEFIN PLASTIC

[75] Inventor: William K. Fischer, Woodbury, Conn.

[73] Assignee: Uniroyal, Inc., New York, N.Y.

[22] Filed: Aug. 29, 1972

[21] Appl. No.: 284,521

[52] U.S. Cl............................ 260/897 A, 260/45.7 P
[51] Int. Cl. ............................................. C08f 37/18
[58] Field of Search................................ 260/897 A

[56] References Cited
UNITED STATES PATENTS

| | | | |
|---|---|---|---|
| 3,256,366 | 6/1966 | Corbelli................................ | 260/897 |
| 3,407,253 | 10/1968 | Yoshimura et al. ................. | 264/289 |
| 3,641,215 | 2/1972 | Usamoto........................... | 260/897 A |

FOREIGN PATENTS OR APPLICATIONS

| | | | |
|---|---|---|---|
| 1,043,078 | 9/1966 | Great Britain...................... | 260/897 |
| 798,416 | 11/1968 | Canada................................ | 260/897 |
| 628,412 | 10/1961 | Canada................................ | 260/897 |

*Primary Examiner*—Murray Tillman
*Assistant Examiner*—C. J. Seccuro
*Attorney, Agent, or Firm*—James J. Long

[57] ABSTRACT

A blend having the properties of a thermoplastic elastomer, including low permanent set, is provided by blending (A) a monoolefin copolymer rubber (e.g., 80 parts of EPM or EPDM) having high zero shear viscosity, with (B) a polyolefin resin (e.g., 20 parts of polypropylene). The blend is useful for making molded or extruded articles (e.g., gaskets, hose) which have good physical properties without requiring vulcanization.

21 Claims, No Drawings

THERMOPLASTIC BLEND OF COPOLYMER RUBBER AND POLYOLEFIN PLASTIC

Commonly assigned copending applications Ser. No. 108,225, filed Jan. 20, 1971 and Ser. No. 171,328 filed Aug. 12, 1971, disclose thermoplastic blends of monoolefin copolymer rubber and and polyolefin plastic.

This invention relates to a blend of polymers which has the characteristics of a thermoplastic elastomer.

Thermoplastic elastomers, which can be processed and fabricated by methods used for thermoplastics and do not require vulcanization to develop elastomeric properties, are known (see, for example, U.S. Pat. No. 3,265,765, Holden et al., Aug. 9, 1966; also Hartman et al., "Butyl Grafted to Polyethylene Yields Thermoplastic Elastomer," Rubber World, October, 1970, pages 59–64). Conventionally these materials have been made by special block copolymerization or polymer grafting methods. The present invention is based on the discovery that thermoplastic elastomeric compositions can be made by blending certain rubbers and resins.

Blends of monoolefin copolymers with polyolefins have previously been disclosed (e.g., U.S. Pat. Nos. 3,256,366, Corbelli et al., June 14, 1966 and 3,456,038, Newman et al., July 15, 1969; British Pat. No. 1,043,078, Phillips Petroleum Co., Sept. 21, 1966; Canadian Pat. Nos. 789,074, Brender et al., July 2, 1968 and 792,277, Schrieber, Aug. 13, 1968; U.S. Pat. No. 3,641,215, Usamoto et al., Feb 8, 1972, etc.), but thermoplastic elastomers based on such blends have not been disclosed.

The present invention is based on the discovery that a thermoplastic blend having highly desirable properties is provided by mixing monoolefin copolymer rubber having certain parameters, and polyolefin plastic. The blend can be fabricated, by such methods as molding, extrusion and calendering, into shaped articles which do not require a vulcanization step to develop good physical properties. The invention thus provides thermoplastic elastomers which can be molded or otherwise shaped without necessity for performing an expensive and time-consuming vulcanization step on the shaped article. Furthermore the blends can be reprocessed, just like a typical thermoplastic material.

Copending application Ser. No. 108,225 referred to above discloses that blends having the characteristics of thermoplastic elastomers can be made by mixing a partially cured monoolefin copolymer rubber (such as EPM or EPDM rubber) with a polyolefin resin (such as polypropylene). The partial cure of the monoolefin copolymer rubber is effected by heating the rubber with a curative such as a peroxide, following which the partially cured rubber is blended with the polyolefin plastic. This method of making the blend is referred to as a two-step method because it involves (1) a first step in which the rubber is partially cured, and (2) a second step in which the partially cured rubber is blended with the plastic.

Copending application Ser. No. 171,328 referred to above discloses what is essentially a single-step method for making a thermoplastic elastomer in which the partial cure of the monoolefin copolymer rubber is carried out in the blend with the polyolefin plastic, for example by masticating EPM or EPDM rubber with polypropylene plastic in the presence of a curative.

The present invention is based on the discovery that treatment of the monoolefin copolymer rubber with a curative (whether beforehand as in the two-step process of Ser. No. 108,225, or simultaneously with the blending with polyolefin resin as in the one-step process of Ser. No. 171,328) is not necessary, provided that there is selected, for blending with the polyolefin plastic, a monoolefin copolymer rubber having a certain combination of parameters.

Accordingly, in accordance with the invention the polyolefin plastic is mixed with a monoolefin copolymer rubber of a certain critically selected kind. More particularly, the monolefin copolymer rubber employed (which may or may not include a polyene component) is characterized by a certain rheological characteristic, specifically by a relatively high value of a viscosity parameter known as "zero shear viscosity." The concept of zero shear viscosity of a polymer is discussed in an article entitled "The Melt Rheology of ABS Polymers" by Robert L. Bergen, Jr. and Harris L. Morris, Proceedings of the Fifth International Congress in Rheology, Vol. 4, 1970, p. 433–447. Zero shear viscosity, also called steady flow viscosity, is a measure of the energy that is expended in flow. It is defined as the melt viscosity at zero shear rate, and it can be determined from stress relaxation data, or from shear creep data in a manner that will be described in detail hereinbelow. For purposes of the present invention, the zero shear viscosity of the monoolefin copolymer rubber should be at least 1, ordinarily from 1 to 100 (zero shear viscosities are expressed herein as poises time ten to the minus ninth power), preferably from 1 to 20, and more preferably from 1 to 10.

It is desired to emphasize that monoolefin copolymer rubber having the stated high zero shear viscosity is a very special kind of material in the sense that it is, as a practical matter, in itself an essentially unprocessable rubber, since it will not readily form a band on a cold mill. This high zero shear rubber is in contrast to the ordinary monoolefin copolymer rubbers (such as are used as starting rubbers in copending applications Ser. Nos. 108,225 and 171,328) which have much lower zero shear viscosities and which are definitely processable materials that can be formed into a band on a cold mill. The special high zero shear viscosity monoolefin copolymer rubber which is operable in the present invention is the same as or similar to the kind of monoolefin copolymer rubber that is ordinarily manufactured not for use per se as a rubber, but for use in making oil-extended monoolefin copolymer rubber; it is a tough, relatively intractable material, compared to the monoolefin copolymers that are useful as rubbers without oil extension.

Another important rheological characteristic of the monoolefin copolymer rubber employed in the invention, especially when the copolymer includes a polyene component, is a parameter known as the "branching index." The branching index provides a measure of the amount of branching of a polymer, and may be defined as the logarithm of the ratio of the zero shear viscosity of the polymer being examined (i.e., in its branched form), to the zero shear viscosity of an otherwise analogous polymer in a purely linear form having the same intrinsic viscosity. (A procedure for determing the branching index of a polymer will be described in more detail hereinbelow.) The branching index of the monoolefin copolymer rubber employed in the invention should be from 1.6 to 3.2, preferably from 1.9 to 2.7 and more preferably from 1.9 to 2.4.

It is remarkable and unexpected that, by selecting a monoolefin copolymer rubber having the foregoing rheological character, namely, the stated high zero shear viscosity, for blending with the polyolefin plastic, there can be obtained a thermoplastic elastomeric composition having the advantageous properties set forth in prior applications Ser. Nos. 108,225 and 171,328, without necessity for a partial curing or cross-linking step, prior to or during the blending.

Of the two characterizing parameters, zero shear viscosity and branching index, the zero shear viscosity is the more significant parameter. However, the branching index is in many cases also a useful characterizing parameter, especially in the case of unsaturated monoolefin copolymer rubbers which include a polyene component.

In general, the monoolefin copolymer rubber employed in the blend of the invention may be described as an essentially amorphous, random, elastomeric copolymer of two or more monoolefins, with or without at least one copolymerizable polyene. Usually two monoolefins are used but three or more may be used. Ordinarily one of the monoolefins is ethylene while the other is preferably propylene. However, other alpha-monoolefins may be used including those of the formula $CH_2 = CHR$ where R is an alkyl radical having for example 1 to 12 carbon atoms (e.g., butene-1, pentene-1, hexene-1, 4-methylpentene-1, 5-methylhexene-1, 4-ethylhexene-1, etc.). While the monoolefin copolymer rubber may be a saturated material, as in ethylene-propylene binary copolymer rubber ("EPM"), it is ordinarily preferred to include in the copolymer a small amount of at least one copolymerizable polyene to confer unsaturation on the copolymer. Although conjugated dienes such as butadiene or isoprene may be used for this purpose (British Pat. No. 983,437; Belgian Pat. No. 736,717, Sumitomo Chemical Co., Jan. 29, 1970), in practice it is usual to employ a non-conjugated diene, including the open-chain non-conjugated diolefins such as 1,4-hexadiene (U.S. Pat. No. 2,933,480 Gresham et al., Apr. 19, 1960) or a cyclic diene, especially a bridged ring cyclic diene, as in dicyclopentadiene (U.S. Pat. No. 3,211,709, Adamek et al., Oct. 12, 1965), or an alkylidenenorbornene as in methylenenorbornene or ethylidenenorbornene (U.S. Pat. No. 3,151,173, Nyce, Sept. 29, 1964), as well as cyclooctadiene, methyltetrahydroindene, etc. (see also such U.S. Pats. as No. 3,093,620 and No. 3,093,621; also No. 3,538,192 col. 6, line 49 to col. 7, line 51). The polyenes employed are not limited to those having only two double bonds, but include those having three or more double bonds. Blends based on unsaturated terpolymer rubber ("EPDM") have the most advantageous properties and are preferred.

Although not as important as the rheological characteristics (especially zero shear viscosity) of the monoolefin copolymer rubber discussed above, other characteristics of the rubber that may be mentioned as significant are the proportions of the monomers, the gel content of the rubber, and the intrinsic viscosity of the rubber. Almost invariably the polyene content of the monoolefin copolymer rubber for blending with the polyolefin plastic is from 0 to 20 percent (all amounts are expressed herein by weight, unless otherwise noted), the ethylene content is from 50 to 80 percent and the content of the other alpha-olefin is from 50 to 10 percent. The gel content of the rubber is almost invariably from 0 to 60 percent (measured in cyclohexane at 73°F) and the intrinsic viscosity is almost invariably from 2.0 to 6.0 (all intrinsic viscosities herein are measured in tetralin at 135°C and are expressed as deciliters per gram.)

Preferably the monoolefin copolymer rubber employed is an EPDM terpolymer, in which the termonomer is a non-conjugated diene present in amount of from 3 to 10 percent, the ethylene content is from 55 to 75 percent, the propylene content is from 42 to 20 percent, the gel content is from 10 to 50 percent and the intrinsic viscosity is from 2.3 to 5.0.

More preferably, the monoolefin copolymer rubber employed is an EPDM terpolymer in which the termonomer is a bridged ring cyclic diene, present in the copolymer in amount of from 2.5 to 7.5 percent, the ethylene content is from 65 to 75 percent, the propylene content is from 32.5 to 20 percent, the gel content is from 20 to 40 percent, and the intrinsic viscosity is from 3.0 to 5.0.

Those skilled in the art of making monoolefin copolymer rubber using a Ziegler - Natta type catalytic system will appreciate that a starting rubber having the characteristics stated can be produced by appropriate regulation of the polymerization variables. The variables include the polymerization temperature and pressure, monomer ratio, monomer concentration, termonomer used, the catalyst system and catalyst concentration. These factors control the structural features of the EPDM polymer chains, that is, their molecular weight, molecular weight distribution and branching. For example, it is well known that the molecular weight can be increased by lowering the polymerization temperature and/or decreasing the amount of catalyst. The molecular weight distribution may depend on the catalyst system employed. Branching is considerably dependent upon the particular termonomer as well as the amount of termonomer used. All of these structural features (molecular weight, molecular weight distribution and branching) affect the zero shear viscosity. Zero shear viscosity increases with molecular weight. For polymers of similar average molecular weight, a broader molecular weight distribution results in a higher zero shear viscosity. The zero shear viscosity of a branched EPDM polymer for instance is higher than that of a linear EPM polymer of the same molecular weight.

A procedure for making a suitable copolymer rubber is as follows:

An EPDM is prepared from a polymerization recipe based on 100 parts of hexane, 7 parts of ethylene, 16 parts of propylene, 1.2 parts of dicyclopentadiene, 0.24 part of ethylaluminum sesquichloride, and 0.012 part of vanadium oxytrichloride. The polymerization is conducted continuously, at a temperature of 110°F under a pressure of 100 pounds per square inch, using an apparatus such as is described in U.S. Pat. No. 3,341,503, Paige et al., Sept. 12, 1967. The hexane is introduced at the rate of 50 pounds per hour, the propylene at the rate of 8 pounds per hour, the ethylene at the rate of 3.5 pounds per hour, and the remaining ingredients (dissolved in a small amount of hexane) at the following rates: dicyclopentadiene, 0.6 pound per hour; ethylaluminum sesquichloride, 0.12 pound per hour; vanadium oxytrichloride, 0.006 pound per hour. The dwell time in the polymerization zone, which has a capacity of about 8 gallons of reaction mixture, is about 55 minutes. The "cement" (solution of polymer) obtained over the first hour and one-half is discarded; the cement obtained during the next three hours is saved. The solids content of the saved cement is 4.2 percent. The terpolymer rubber recovered from the cement has an ethylene content of 62 percent, a propylene content of 33.5 percent, a dicyclopentadiene content of 4.5 percent, a gel content of 32 percent, an intrinsic viscosity of 3.6. The zero shear viscosity is 4.4 times $10^9$ poises, and the branching index is 2.1. The described EPDM, even in the uncured (non-crosslinked) state in which it is employed, is a tough, rather intractable polymer that would ordinarily be classified as unprocessable per se; it does not form a coherent sheet on a cold mill unlike the usual EPDM's classified as processable. It is the kind of polymer that is ordinarily employed in making highly oil-extended EPDM, but it is not employed per se to make shaped articles.

The polyolefin resin with which the monoolefin copolymer rubber is mixed to make the blend of the invention is a solid, high molecular weight resinous plastic material made by polymerizing such olefins as ethylene, propylene, butene-1, pentene-1, 4-methylpentene, etc., in conventional manner. Thus, such essentially crystalline polyolefins as polyethylene (either of the low density [e.g., 0.910–0.925 g/cc], medium density [e.g., 0.926 – 0.940 g/cc] or high density [e.g., 0.941–0.965 g/cc]) may be used, whether prepared by high pressure processes or low pressure processes, including linear polypropylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amporphous, random ethylenepropylene elastomers) can also be used. Included among the polyolefin resins are the higher alpha-olefin modified polyethylenes and polypropylenes (see "Polyolefins," N. V. Boenig, Elsevier Publishing Co., N.Y., 1966).

The relative proportions of monoolefin copolymer rubber and polyolefin plastic employed in the blends of the invention may vary from 50 to 90 parts (preferably 60 to 85 parts, more preferably 65 to 80 parts) of at least one monoolefin copolymer rubber and correspondingly 50 to 10 parts (preferably 40 to 15 parts, more preferably 35 to 20 parts) of at least one polyolefin plastic, depending on the characteristics desired in the blends. The larger the proportion of the monoolefin copolymer rubber the more pronounced the elastomeric character of the blend.

The blend of the invention may be prepared by mixing the monoolefin copolymer rubber and polyolefin plastic together to make a uniform composition, with the aid of any suitable conventional rubber or plastic mixing machinery, such as an internal mixer of the Banbury type and/or an open mixer such as a roll mill. The mixing of the monoolefin copolymer rubber and polyolefin plastic is carried out under such conditions that a temperature sufficiently elevated (e.g., 250°–400°F) to melt the polyolefin, that is, a temperature above the crystalline melting range of the plastic, is achieved during at least a portion of the mixing cycle, to provide the desired homogeneous dispersion of the two polymer phases with each other. It will be understood that the mastication of the two polymers together causes heat to be generated and raises the temperature of the mass, but in addition external heating (or cooling) may be undertaken if necessary.

Any suitable other desired ingredients may be present, such as processing aids or lubricants, mold release agents, u.v. screening agents, antioxidants or stabilizers for the rubber or resin or both, etc. Any conventional antioxidant or stabilizer may be used, including, by way of non-limiting example, amine types, phenolic types, sufides, phenyl alkanes, phosphites, etc. Representative materials are listed in "Rubber: Natural and Synthetic," Stern, Palmerton Publishing Co., New York, 1967, especially at pages 244–256; see also "Chemistry and Technology of Rubber," Davis & Blake, Reinhold, New York, 1937, Chapter XII. Included are such materials as 2,2,4-trimethyl-1,2-dihydroquinoline, diphenylamine acetone condensate, aldol-alpha-naphthylamine, octylated diphenylamine, N-phenyl-N'-cyclohexyl-p-phenylenediamine, 2,6-di-tert.-butyl-4-methylphenol, styrene-resorcinol resin, o-cresolmonsulfide, di-p-cresol-2-propane, 2,5-di-tert.-amylhydroquinone, dilauryl-3,3'-thiodipropionate and similar dialkyl thiodipropionates, etc.

The blend of the invention, based on monoolefin copolymer rubber having a high zero shear viscosity and polyolefin plastic, provides a noteworthy combination of processability (including the ability to be reprocessed repeatedly) with good physical characteristics. The good physical characteristics include properties heretofore usually associated only with vulcanized or thermoset (not reprocessable) materials, notably low permanent set. The blends of the invention accordingly afford a way of producing thermoformed shaped objects (e.g., by extrusion, injection or compression molding, calendering, vacuum forming, etc.) which combines the convenience and speed of thermoplastic shaping with certain physical characteristics of thermoset or vulcanized elastomers.

Heretofore, certain desirable characteristics such as low permanent set have largely been obtainable only in vulcanized elastomers which required the molder to use a rather long dwell time in the mold to effect vulcanization. The vulcanized flash or scrap could not be reprocessed. On the other hand, thermoplastic materials could be molded rapidly and scrap could be reprocessed, but certain physical characteristics such as permanent set were usually rather poor. The present blends consisting essentially of monoolefin copolymer rubber having high zero shear viscosity and polyolefin plastic combine in one material the advantages of rapid moldability and reprocessability with the advantages of a vulcanizate (low permanent set).

It will be understood that in many plastic and elastomer shaping operations a considerable percentage of scrap is produced. For example, scrap is produced in dieing out parts from extruded, press-molded or calendered sheet, and in screw-injection molding waste sprues and runners result. Such scrap produced from the blend of the invention may be chopped and reextruded with no significant deterioration in appearance or processing characteristics. The blends, in addition to being reprocessable, have enhanced properties including tensile strength, elongation, and resistance to compression set, resistance to deterioration in oil, reduced elongation set, and improved resistance to abrasion and flex-cracking.

Good shaping characteristics of the blends render them useful in shaping or molding articles of all sorts, and especially in extrusion. Useful articles that may be made from the blends of the invention include extruded insulation on wire, gaskets, flexible tubing, balls, weather-stripping, flexible bumpers, hose, etc.

In comparison to a commerically available thermoplastic elastomer which is a butadiene-styrene block copolymer known as Kraton 3125, blends of the invention have higher hardness and, more importantly, much greater retention of hardness when heated to elevated temperatures. Heat deflection upon subjecting to pressure is less for compositions of the invention. The volume change of compositions of the invention after immersion in fuel oil is less.

The elastomeric character of objects shaped without vulcanization from blends of the invention is perhaps evidenced most strikingly by low elongation set at break. For purposes of the invention the elongation set at break should be not greater than 70 percent, preferably not greater than 50 percent, and more preferably not greater than 30 percent, measured by the method of ASTM D 412. Other physical properties including tensile strength and ultimate elongation (elongation at break) are also important. The blends of the invention should have a tensile strength of a least 750 psi, preferably at least 800 psi, and more preferably at least 900 psi (ASTM D 412). The ultimate elongation should be at least 100 percent, preferably at least 150 percent, and more preferably at least 200 percent (ASTM D 412). The combined effect of the three important properties, namely, tensile strength, ultimate elongation, and elongation set at break, may be expressed as a "Performance Factor," P.F., which is given by the following equation:

P.F., psi = (Tensile Strength, psi) × (Elongation at Break,%)/(Elongation Set at Break,%)

Blends of the invention, in addition to having the above-stated values for tensile, elongation, and set, are characterized by a Performance Factor of at least 4,000 psi, preferably at least 5,000 psi, and more preferably at least 6,000 psi.

The following examples, in which all quantities are expressed by weight unless otherwise indicated, will serve to illustrate the practice of the invention in more detail. In the examples the ethylene, propylene and diene content are determined by infrared analysis.

The gel content is determined by immersing a weighed sample (approximately 0.25 gram) of the rubber in 100 ml. of cyclohexane at room temperature (about 73°F) in a closed jar for 48 hours, thereafter removing a 50 ml. aliquot of the solution, and determining the solids content thereof by evaporating the solvent. The gel is calculated according to the following expression:

% gel = 100 − (wt. of residue × 200)/sample wt.

The zero shear viscosity is measured at 135°C using a shear creep viscometer. (A conventional shear creep viscometer is described in J. D. Ferry, "Viscoelastic Properties of Polymers," John Wiley, New York, 1970; see also the references therein.) The apparatus employed herein has a double parallel plate arrangement in which two samples of the rubber (1 × 1 × 0.25 inch) are clamped together between two outer plates and an intermediate plate. The rubber is sheared by applying a force (e.g., 200 gr) unilaterally of the central plate. The resulting displacement is plotted as a function of time to give a creep curve. The rate of creep is very rapid initially but gradually decreases to a constant rate (e.g., after several hours). The slope of the creep curve at such constant rate is the "limiting slope." The zero shear viscosity may be calculated from the limiting slope of the creep curve, the force applied to the samples, and the dimensions of the samples, according to the expression:

$\eta_o = W \times 980.67/([A_1/h_1] + [A_2/h_2]) \times$ Limiting Slope where W is the displacing force or load applied to the samples expressed in grams, 980.67 is the acceleration due to gravity expressed in cm/sec², $A_1$ and $A_2$ are the areas of the two samples expressed in cm² (i.e., 6.45 cm² each), $h_1$ and $h_2$ are the thicknesses of the two samples expressed in cm (i.e., 6.35 cm each), and the limiting slope is expressed in cm of displacement per second; the zero shear viscosity, $\eta_o$, is thereby given in poises (gr/cm/sec). Since the zero shear viscosity expressed in poises is an inconveniently large number, it is usually expressed herein as poises times ten to the minus ninth power. The small deformations involved in this test (e.g., $10^{-9}$ cm/sec) are conveniently measured by means of a linear differential transducer (LDT); the output voltage of the LDT is recorded on a chart and is easily converted to a displacement using a calibration factor. The rubber samples employed are compression molded at 300°F for 20 minutes under a pressure of 3,000 psi. The molded samples are then cooled slowly (1 to 2 hours) under pressure to room temperature. (A tensile creep method such as is described by T. G. Fox et al. in Rheology, Vol. 1, Academic Press, Inc., New York, 1956, Chap. 12, p. 437 may also be used to determine zero shear viscosity.)

To calculate the branching index of a branched EPDM rubber from the zero shear viscosity of the EPDM, it is necessary to know the zero shear viscosity of an analogous linear polymer (usually EPM) having the same intrinsic viscosity as the EPDM. For instance, with respect to Example 1, the zero shear viscosity of a linear EPM ($\eta_o^L$), having an intrinsic viscosity of 3.6, is $3.2 \times 10^7$ poises, whereas the zero shear viscosity of the branched EPDM elastomer of Example 1 ($\eta_o^B$) having the same intrinsic viscosity as the linear EPM, is $4.4 \times 10^9$ poises. From the two zero shear viscosities the branching index (B.I.) is determined according to the following equation:

B.I. = log ($\eta_o^B/\eta_o^L$)

Thus, for Example 1:

B.I. = log ($4.4 \times 10^9/3.2 \times 10^7$) = log $1.4 \times 10^2$

B.I. = 2.1

EXAMPLE 1

An ethylene-propylene-dicyclopentadiene rubber is provided, having the characteristics noted in Table I, for example according to the polymerization procedure previously described in detail above.

A polypropylene resin is provided which is an isotactic and largely crystalline material having a melt flow index of 4.0 (ASTM D1238–57T, 230°C), a density of 0.903 and 94 percent gel (cyclohexane, 48 hrs. at 73°F), known as Profax 6523 (trademark).

Eighty parts of the EPDM rubber, 20 parts of the polypropylene plastic and 1.0 part of antioxidant (nonylated phenyl phosphite "Polygard"[trademark]) are charged to a No. 11 Banbury mixer which is cooled by circulation of cooling water through the jacket and rotors. The mixer is run at No. 2 speed until the "chart temperature"(i.e., the temperature registered by a thermocouple mounted in the surface of the mixing chamber; the stock temperature is perhaps 20°–30°F higher) reaches 380°F (this requires about 7 minutes of mixing). The mix is then dropped from the mixer and is formed into a sheet on a hot (about 250°F) mill. The sheet is chopped up into pellets.

Physical properties of the blend as determined on screw injection molded test specimens are as follows: tensile strength, 1210 psi; elongation at break, 180 percent; elongation set at break, 14 percent; "Performance Factor" (i.e., the product of tensile and elongation divided by elongation set), 15,600; compression set 77 percent; measured gel content 81 percent; calculated gel, 45 percent; extrusion rating 10.

The compression set is determined according to the procedure of ASTM D 395, method B.

The gel content of the blend is determined in the same manner as described above for the gel content of the rubber. The calculated gel content of the blend, expressed in percent, is given by the expression $$[(\% \text{ EPR}) \times (\% \text{ Gel EPR}) + (\% \text{ PO}) \times (\% \text{ Gel PO})]/100$$

where "% EPR" is the content of EPR in the blend, "% Gel EPR" is the gel content of the EPR, "% PO" is the content of polyolefin in the blend, and "% Gel PO" is the gel content of the polyolefin.

The extrusion rating is determined on a Brabender extruder (type EX3A, No. 191) under the following conditions: screw compression ratio 2.5/1, screw speed 20 rpm, temperature at rear of barrel 375°F., temperature at front of barrel 420°F., die diameter ⅛ inch, temperature of die 440°F. The material is considered extrudable if the extrudate feels smooth to the touch, otherwise it is not; ratings are assigned on a scale from 10 (excellent, perfectly smooth) to 0 (poor, rough); 8 is acceptable, 5 is fair.

The results of this example, and additional examples, are summarized in Table I. In Table I, the ethylene propylene and diene content of the monoolefin copolymer rubbers are all expressed in percent on a weight basis. The intrinsic viscosity is expressed in deciliters per gram (measured in tetralin at 135°C.). The gel content is expressed as percent by weight. The zero shear viscosity is expressed as poises times 10 to the minus ninth power, determined from shear creep data at 135°C as described above. The tensile strength is expressed in psi; the elongation at break, elongation set at break, and compression set are expressed in percent. The performance factor is expressed as psi times 10 to the minus third power.

Table I

80/20 Blends of Monoolefin Copolymer Elastomers with Polypropylene

| Example No. | 1 | 2 | 3 | 4 | 5 | 6 | 7 | 8 |
|---|---|---|---|---|---|---|---|---|
| EPR | | | | | | | | |
| Ethylene | 62 | 67.5 | 68 | 66.5 | 62.5 | 68 | 64 | 68 |
| Propylene | 33.5 | 29 | 26.5 | 30.5 | 32 | 29 | 32.5 | 29 |
| Dicyclopentadiene | 4.5 | 3.5 | 5.5 | 3 | 5.5 | 3 | 3.5 | 3 |
| Intrinsic viscosity | 3.6 | 3.6 | 4.3 | 3.5 | 3.1 | 3.2 | 3.4 | 3.4 |
| Gel | 32 | 33 | 47 | 13 | 41 | 32 | 12 | 32 |
| Zero shear viscosity | 4.4 | 3.7 | 37.9 | 12.8 | 3.9 | 1.8 | 2.6 | 2.8 |
| Branching index | 2.1 | 2.1 | 2.7 | 2.7 | 2.4 | 2.1 | 2.0 | 2.1 |
| Properties of blend | | | | | | | | |
| Actual gel | 81 | 77 | 82 | 69 | 69 | 76 | 66 | 76 |
| Calculated gel | 45 | 46 | 57 | 29 | 52 | 45 | 29 | 45 |
| Tensile strength | 1210 | 1180 | 1560 | 1000 | 950 | 1030 | 1000 | 940 |
| Elongation at break | 180 | 190 | 420 | 230 | 200 | 220 | 230 | 380 |
| Elongation set at break | 14 | 33 | 70 | 30 | 25 | 30 | 35 | 58 |
| Compression set | 77 | 74 | 59 | 63 | 79 | 70 | 75 | 69 |
| Performance factor | 15.6 | 9.75 | 9.36 | 7.67 | 7.60 | 7.55 | 6.57 | 6.16 |
| Extrusion rating | 10 | 9 | 5 | — | 5 | 8 | — | 10 |

| Example No. | 9 | 10 | 11 | 12 | 13 | 14 | A | B | C |
|---|---|---|---|---|---|---|---|---|---|
| EPR | | | | | | | | | |
| Ethylene | 52 | 55.5 | 64 | 65 | 56 | 59.5 | 56 | 47.5 | 64 |
| Propylene | 44 | 40 | 31.5 | 35 | 39 | 36.5 | 44 | 47.5 | 26 |
| Dicyclopentadiene | 4 | 4.5 | 4.5 | 0 | 50 | | | | |
| Intrinsic viscosity | 2.3 | 3.2 | 3.3 | 3.7 | 3.2 | 3.4 | 3.2 | 2.1 | 1.8 |
| Gel | 5.5 | 2 | 1 | 0 | 4 | 21 | 0 | 3 | 20 |
| Zero shear viscosity | 1.7 | 6.0 | 3.6 | 3.4 | 2.8 | 5.4 | 0.26 | 0.59 | 0.45 |
| Branching index | 2.6 | 2.5 | 2.2 | 2.0 | 2.2 | 2.4 | 1.1 | 2.3 | 2.5 |
| Properties of Blend | | | | | | | | | |
| Actual gel | 44 | 52 | 69 | 41 | 63.5 | 51 | 57.5 | 30 | 48 |
| Calculated gel | 23 | 21 | 20 | 19 | 22 | 36 | 19 | 21 | 35 |
| Tensile strength | 1150 | 880 | 800 | 790 | 810 | 750 | 700 | 680 | 860 |
| Elongation at break | 100 | 160 | 170 | 360 | 150 | 180 | 310 | 90 | 220 |
| Elongation set at break | 20 | 25 | 25 | 55 | 27 | 33 | 63 | 20 | 48 |
| Compression set | 74 | 81 | 76 | 95 | 82 | 74 | 103 | 90 | 92 |
| Performance factor | 5.75 | 5.63 | 5.44 | 5.17 | 4.50 | 4.09 | 3.44 | 3.06 | 3.94 |
| Extrusion rating | 10 | 6 | 7 | — | 7 | 6 | 8 | 9 | 9 |

Examples 2–14

Table I also summarizes Examples 2–14, which are carried out essentially according to the procedure of Example 1, using various high zero shear viscosity EPDM terpolymer rubbers or saturated EPM binary copolymer rubber (Example 12), having the composition and properties shown in Table I. Examples 2–14 use the same polypropylene resin as in Example 1, which is blended with the EPR in 80/20 rubber/resin ratio as previously described in the absence of any curing cross-linking agent, with the results shown.

Control runs A, B and C in Table I are outside the invention and are included for purposes of comparison, to show that unsatisfactory results are obtained if the zero shear viscosity of the rubber is not at least $1 \times 10^9$ poises. All of the control runs fail to achieve the required performance factor of 4,000 psi or more.

Examples 15–18

An EPDM is provided having the following characteristics:

| | |
|---|---|
| ethylene content | 61% |
| propylene content | 34% |
| dicyclopentadiene content | 5% |
| gel | 32% |
| intrinsic viscosity | 3.6 |
| zero shear viscosity | $4.4 \times 10^9$ poises |

This EPDM is mixed with the same polypropylene as in Example 1, according to the procedure there described, in various ratios as shown in Table II, with the results shown.

Table II

| Example No. | 15 | 16 | 17 | 18 |
|---|---|---|---|---|
| Blend | | | | |
| EPR, parts | 90 | 80 | 70 | 60 |
| Polypropylene, parts | 10 | 20 | 30 | 40 |
| Physical Properties | | | | |
| Tensile strength, psi | 1060 | 1210 | 1530 | 2020 |
| Elongation at break, % | 250 | 220 | 150 | 80 |
| Elongation set at break, % | 23 | 28 | 30 | 30 |
| Compression set, % | — | 77 | 88 | 88 |
| Gel, actual % | 71 | 77 | 86 | 89 |
| Gel, calculated % | 38 | 45 | 51 | 57 |
| Performance Factor, psi $\times 10^{-3}$ | 11.5 | 9.51 | 7.90 | 5.39 |

Examples 19–22

An EPDM is provided having the following characteristics:

| | |
|---|---|
| ethylene content | 68% |
| propylene content | 29% |
| dicyclopentadiene content | 3% |
| gel | 32% |
| intrinsic viscosity | 3.4 |
| Zero shear viscosity | $2.8 \times 10^9$ poises |

A low density polyethylene (l.d. PE in Table III) is provided having a melt flow index of 2.0, a density of 0.919 and nil gel content (DYNH–1, trademark).

A high density polyethylene (h.d. PE in Table III) is provided having a melt flow index of 0.3, a density of 0.956 and 90 percent gel (Hi-Fax 4601, trademark).

Following essentially the procedure of Example 1, blends are prepared in the proportions shown in Table III, with the results shown.

Table III

| | Blends of EPDM with Polyethylene | | | |
|---|---|---|---|---|
| Example No. | 19 | 20 | 21 | 22 |
| Blend | | | | |
| EPR, parts | 80 | 60 | 80 | 60 |
| l.d. PE, parts | 20 | 40 | — | — |
| h.d. PE, parts | — | — | 20 | 40 |
| Physical Properties | | | | |
| Tensile strength, psi | 840 | 1160 | 1240 | 1480 |
| Elongation at break, % | 290 | 190 | 210 | 130 |
| Elongation set at break, % | 35 | 30 | 25 | 33 |
| Compression set, % | 46 | 59 | — | 32 |
| Gel, actual % | 82 | 90 | 84 | 91 |
| Gel, calculated % | 24 | 19 | 45 | 57 |
| Performance factor, psi $\times 10^{-3}$ | 6.96 | 7.35 | 10.4 | 5.83 |

What is claimed is:

1. A thermoplastic elastomeric blend of:
   A. an unsaturated rubbery interpolymer of at least two different alpha-monoolefins with a small amount up to 20 percent by weight of at least one copolymerizable non-conjugated diene, said interpolymer having a zero shear viscosity of at least $1 \times 10^9$ poises, determined from shear creep data at 135°C.; and
   B. a resinous high molecular weight poly-alpha-monoolefin plastic,
   wherein the weight ratio of the said rubbery interpolymer (A) to the said poly-alpha-monoolefin plastic (B) is within the range of from 90/10 to 50/50, said blend characterized by the fact that the tensile strength of the blend in psi times the elongation at break of the blend expressed in percent divided by elongation set at break expressed in percent is at least 4000 psi.

2. A blend as in claim 1 in which (B) is selected from the group consisting of polypropylene and polyethylene.

3. A blend as in claim 2 consisting essentially of 80 parts of (A), the said (A) being an ethylene-propylene-non-conjugated diene terpolymer rubber of an intractable, unprocessable kind that is ordinarily used to make highly oil-extended ethylene-propylene-non-conjugated diene terpolymer rubber, and correspondingly 20 parts by weight of (B), the said (B) being polypropylene.

4. A blend as in claim 3 having an elongation set at break not greater than 70 percent.

5. A blend as in claim 3 having a tensile strength of at least 750 psi, an elongation at break of at least 100 percent and an elongation set at break not greater than 70 percent.

6. A thermoplastic elastomeric blend of
   A. an uncured unsaturated ethylene-propylene-non-conjugated diene terpolymer rubber containing up to 20 percent by weight of said diene having a zero shear viscosity of at least $1 \times 10^9$ poises determined by shear creep data at 135°C. and a branching index of from 1.6 to 3.2 with
   B. a resinous high molecular weight poly-alpha-monoolefin plastic selected from the group consisting of polypropylene and polyethylene,
   wherein the weight ratio of the said terpolymer rubber (A) to the said plastic (B) is within the range of from 85/15 to 60/40, said blend being characterized by the fact that the tensile strength of the blend in psi times the elongation at break of the blend expressed in percent divided by the elongation set at break expressed in percent is at least 4000 psi.

7. A blend as in claim 6 having an elongation set at break not greater than 50 percent.

8. A thermoplastic elastomeric blend of (A) an uncured elastomeric copolymer of at least two different alpha-monoolefins with a small amount up to 20 percent by weight of at least one copolymerizable nonconjugated diene, having a zero shear viscosity of from $1 \times 10^9$ poises to $100 \times 10^9$ poises, determined from shear creep data at 132°C., a branching index of from 1.6 to 3.2, a gel content of from 0 to 60 percent by weight, and an intrinsic viscosity of from 2 to 6, with B. a crystalline resinous high molecular weight poly-alpha-olefin plastic selected from the group consisting of polypropylene and polyethylene, the amount of (A) being from 50 to 90 parts by weight and the amount of (B) being correspondingly from 50 to 10 parts by weight, the said (A) and (B) being blended together in the absence of cross-linking agent, the resulting blend having an elongation set at break not greater than 70 percent, a tensile strength of at least 750 psi, an ultimate elongation of at least 100 percent, and the product of the tensile strength of the blend expressed in psi times the ultimate elongation expressed in percent divided by the elongation set at break expressed in percent being at least 4000 psi, the said properties in the blend being achieved without vulcanization, the blend being characterized by good molding properties and being reprocessable.

9. A blend as in claim 8 in which (A) contains 50 to 80 percent ethylene and 50 to 10 percent propylene, by weight.

10. A thermoplastic elastomeric blend of

A. an uncured elastomeric terpolymer of 55 to 75 percent by weight of ethylene, 42 to 20 percent by weight of propylene and 3 to 10 percent by weight of a copolymerizable non-conjugated diene, having a zero shear viscosity of from $1 \times 10^9$ poises to $20 \times 10^9$ poises, determined from shear creep data at 135°C., a branching index of from 1.9 to 2.7, a gel content of from 10 to 50 percent by weight, and an intrinsic viscosity of from 2.3 to 5.0, with B. a crystalline resinous high molecular weight poly-alpha-olefin plastic selected from the group consisting of polypropylene and polyethylene, the amount of (A) being from 60 to 85 parts by weight and the amount of (B) being correspondingly from 40 to 15 parts by weight, the said (A) and (B) being blended together in the absence of cross-linking agent, a temperature sufficiently elevated to melt (B) being achieved during the blending of (A) and (B), the resulting blend, in an uncured state, having an elongation set at break not greater than 50 percent, a tensile strength of at least 800 psi, an ultimate elongation of at least 150 percent, and the product of the tensile strength of the blend expressed in psi times the ultimate elongation expressed in percent divided by the elongation set at break expressed in percent being at least 5000 psi, the blend being characterized by good molding properties and being reprocessable.

11. A blend as in claim 10, in the form of an extruded article.

12. A blend as in claim 10 in which the non-conjugated diene is dicyclopentadiene.

13. A blend as in claim 10 in which the polyolefin plastic (B) is polypropylene.

14. A blend as in claim 10 in which the polyolefin plastic (B) is polyethylene.

15. A thermoplastic elastomeric blend of

A. an uncured elastomeric terpolymer of 65 to 75 percent by weight of ethylene, 32.5 to 20 percent by weight of propylene, and 2.5 to 7.5 percent by weight of a copolymerizable non-conjugated cyclic diene, having a zero shear viscosity of from $1 \times 10^9$ poises to $10 \times 10^9$ poises, determined from shear creep data at 135°C., a branching index of from 1.9 to 2.4, a gel content of from 20 to 40 percent by weight, and an intrinsic viscosity of from 3.0 to 5.0, said terpolymer being of an intractable, unprocessable kind that is ordinarily used to make highly oil-extended ethylenepropylene-non-conjugated cyclic diene terpolymer rubber, with B. a crystalline resinous high molecular weight poly-alpha-olefin plastic selected from the group consisting of polypropylene and polyethylene, the amount of (A) in the blend being from 65 to 80 parts by weight and the amount of (B) in the blend being correspondingly from 35 to 20 parts by weight, the said (A) and (B) being blended together at elevated temperature in the absence of curative, a blending temperature sufficiently elevated to melt (B) being achieved during the blending, the resulting blend, in an uncured state, having an elongation set at break not greater than 30 percent, a tensile strength of at least 900 psi, an ultimate elongation of at least 200 percent, and the product of the tensile strength of the blend expressed in psi times the ultimate elongation expressed in percent divided by the elongation set at break expressed in percent being at least 6,000 psi, the blend being characterized by good shaping properties and being repeatedly reprocessable.

16. A blend as in claim 15 in which (B) is polypropylene.

17. A blend as in claim 16, containing 80 parts by weight of (A) and correspondingly 20 parts by weight of (B).

18. A blend as in claim 15, in which (B) is polyethylene.

19. A blend as in claim 15, in which the said cyclic diene is dicyclopentadiene.

20. A blend as in claim 15, in the form of an extruded article.

21. A method of making an extruded or molded thermoplastic elastomeric shaped article comprising providing a thermoplastic elastomeric blend as in claim 20, and thereafter extruding or molding the said blend in a desired shape without cure, thereby producing without any curing step, a shaped article which is both elastomeric and reprocessable.

* * * * *